US011465923B2

(12) United States Patent
Frigon

(10) Patent No.: US 11,465,923 B2
(45) Date of Patent: *Oct. 11, 2022

(54) WASTEWATER TREATMENT SYSTEM AND METHODS

(71) Applicant: SOSYSTEMS, INC., Annapolis, MD (US)

(72) Inventor: George Frigon, Easton, MD (US)

(73) Assignee: SOSYSTEMS, INC., Annapolis, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/984,039

(22) Filed: Aug. 3, 2020

(65) Prior Publication Data

US 2021/0206680 A1 Jul. 8, 2021

Related U.S. Application Data

(63) Continuation of application No. 15/389,423, filed on Dec. 22, 2016, now Pat. No. 10,730,775, which is a
(Continued)

(51) Int. Cl.
*C02F 9/00* (2006.01)
*C02F 1/00* (2006.01)
*C02F 1/70* (2006.01)
*C02F 1/04* (2006.01)
*C02F 1/28* (2006.01)
(Continued)

(52) U.S. Cl.
CPC ............... *C02F 9/00* (2013.01); *C02F 1/00* (2013.01); *C02F 1/048* (2013.01); *C02F 1/283* (2013.01); *C02F 1/32* (2013.01); *C02F 1/441* (2013.01); *C02F 1/444* (2013.01); *C02F 1/50* (2013.01); *C02F 1/5245* (2013.01); *C02F 1/70* (2013.01); *C02F 3/04* (2013.01); *C02F 3/1242* (2013.01); *C02F 2103/005* (2013.01); *C02F 2209/005* (2013.01); *C02F 2209/02* (2013.01);
(Continued)

(58) Field of Classification Search
CPC .... C02F 1/00; C02F 1/04; C02F 1/048; C02F 1/70; C02F 1/283; C02F 1/32; C02F 1/441; C02F 1/444; C02F 1/50; C02F 1/5245; C02F 9/00; C02F 3/04; C02F 3/1242; C02F 2103/005; C02F 2209/44; C02F 2209/005; C02F 2209/02; C02F 2209/42; Y02W 10/10; Y02W 10/37; Y02W 10/15
USPC ............ 210/749, 800, 790, 198.1, 175, 757
See application file for complete search history.

(56) References Cited

U.S. PATENT DOCUMENTS

| 6,287,469 | B1* | 9/2001 | Ashburn | C02F 3/30 210/605 |
| 2004/0084379 | A1* | 5/2004 | Ballard | C02F 5/08 210/723 |
| 2008/0314830 | A1* | 12/2008 | Banerjee | C02F 1/5245 210/631 |

* cited by examiner

*Primary Examiner* — Akash K Varma
(74) *Attorney, Agent, or Firm* — J.A. Lindeman & Co., PLLC

(57) ABSTRACT

Disclosed are wastewater treatment systems and methods of treating wastewater. In particular, this disclosure provides a method of lowering the biological oxygen demand, total nitrogen, total suspended solids, and phosphorous within wastewater containing human excrements. In addition to improving the quality of the wastewater on a per Liter basis, this disclosure also provides methods and systems that reduce the absolute quantity of total nitrogen, total suspended solids, and phosphorous released into the environment through effluent. The disclosed methods and systems also provide ways of reintroducing water into the environment.

19 Claims, 11 Drawing Sheets

Related U.S. Application Data continuation of application No. 13/567,075, filed on Aug. 5, 2012, now Pat. No. 9,556,038.

(60) Provisional application No. 61/574,755, filed on Aug. 9, 2011.

(51) Int. Cl.
*C02F 1/44* (2006.01)
*C02F 3/04* (2006.01)
*C02F 3/12* (2006.01)
*C02F 1/52* (2006.01)
*C02F 1/32* (2006.01)
*C02F 1/50* (2006.01)
*C02F 103/00* (2006.01)

(52) U.S. Cl.
CPC .......... *C02F 2209/42* (2013.01); *Y02W 10/10* (2015.05); *Y02W 10/37* (2015.05)

WASTEWATER TREATMENT SYSTEM AND METHODS

CROSS-REFERENCE TO RELATED APPLICATIONS

This application is a continuation application of U.S. patent application Ser. No. 15/389,423, filed on Dec. 22, 2016, which is a continuation application of U.S. patent application Ser. No. 13/567,075, filed on Aug. 5, 2012 and which issued as U.S. Pat. No. 9,556,038 on Jan. 31, 2017, and which claims priority to U.S. Provisional App. No. US 61/574,755, filed on Aug. 9, 2011, each of which is incorporated by reference.

TECHNICAL FIELD

The invention relates to wastewater treatment systems and methods of treating wastewater. In particular, this invention relates to lowering the biological oxygen demand, total nitrogen, total suspended solids, and phosphorous within wastewater containing human excrements. In addition to improving the quality of the wastewater, this invention also provides methods and systems that reduce the amount of water (H2O) within the wastewater.

BACKGROUND

Wastewater is any water that has been adversely affected in quality by anthropogenic influence. It comprises liquid waste discharged by domestic residences, commercial properties, industry, and/or agriculture and can encompass a wide range of potential contaminants and concentrations. The term wastewater includes "sewage," which is wastewater including feces and/or urine. "Sewage" includes domestic, municipal, or industrial liquid waste products disposed of, usually via a pipe or sewer or similar structure, sometimes in a cesspool emptier.

The precise composition of wastewater varies depending on the source. All wastewater consists mostly of water, which is often added during flushing to carry waste down a drain. Wastewater also may contain pathogens (such as bacteria, viruses, prions and parasitic worms), non-pathogenic bacteria, organic materials (such as feces, hairs, food, vomit, paper fibers, plant material, humus, urea, fruit sugars, soluble proteins, drugs, drug metabolites), inorganic particulate matter (such as sand, grit, metal particles, ceramics, etc), soluble inorganic material (such as ammonia, road salt, sea salt, cyanide, hydrogen sulfide, thiocyanates, thiosulfates), animals (such as protozoa, insects, arthropods, small fish, etc.), macro-solids (such as sanitary napkins, diapers), gases (such as hydrogen sulfide, carbon dioxide, methane, etc.), emulsions (such as paints, adhesives, mayonnaise, hair colorants, emulsified oils, etc.), pesticides, herbicides, etc.

Many of the above listed wastewater components degrade by oxidative pathways. The oxidation can be aerobic and/or anaerobic. The oxidation can take place either with or without biologic (e.g., bacterial) participation. In either case, the oxidation demands oxygen (either directly or indirectly) as a reactant. Accordingly, as wastewater components are degraded, oxygen is consumed. In a very general sense the degradation of wastewater adheres to the following formula:

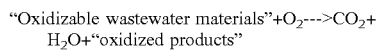
"Oxidizable wastewater materials"+$O_2$--->$CO_2$+ $H_2O$+"oxidized products"

Some oxidizable wastewater materials comprise nitrogen. Some oxidized products comprise nitrogen. Total Kjeldahl Nitrogen (TKN) is the sum of organic nitrogen, ammonia ($NH_3$), and ammonium ($NH_4^+$) in wastewater. Total Nitrogen (TN) also includes the nitrate and nitrite in the wastewater. Accordingly, one may calculate TN by adding the concentrations of nitrate and nitrite to TKN.

Some oxidizable wastewater materials comprise phosphorous. Some oxidized products comprise phosphorous. Phosphorus may be found in several forms, including dissolved form (orthophosphate), inorganic form (reactive plus condensed or acid hydrolysable phosphate) and organically bound forms. Total Phosphorus is the sum of reactive, condensed and organic phosphorous.

Almost any component of wastewater will initiate oxidation. The amount of oxygen consumed in the process of oxidizing the oxidizable wastewater materials can be measured in commercial laboratories as the Biochemical Oxygen Demand (BOD). Such chemicals are also liable to be broken down using strong oxidizing agents and these chemical reactions create what is measured in the laboratory as the Chemical Oxygen Demand (COD). Both the BOD and COD tests are a measure of the relative oxygen-depletion effect of a waste contaminant. Both have been widely adopted as a measure of potential pollution. The BOD test measures the oxygen demand of biodegradable pollutants whereas the COD test measures the oxygen demand of oxidizable pollutants (not necessarily limited to biodegradable components).

The 5-day BOD measures the amount of oxygen consumed by biochemical oxidation of waste contaminants in a 5-day period. The total amount of oxygen consumed when the biochemical reaction is allowed to proceed to completion is called the Ultimate BOD. There are also many different COD tests of which the 4-hour COD is probably the most common.

The laboratory test procedures for the determining the above oxygen demands are detailed in many standard texts, including the Standard Methods For the Examination Of Water and Wastewater, published jointly by the American Public Health Association, the American Waters Works Association, and the Water Environment Association.

Total Suspended Solids (TSS) refers to solids in water (mg/L) that can be trapped by a filter. TSS can include a wide variety of material, such as sand, silt, decaying plant and animal matter, industrial wastes, etc. High concentrations of suspended solids can cause many problems for stream health and aquatic life. To measure TSS, the water sample is filtered through a pre-weighed filter. The residue retained on the filter is dried in an oven at 103 to 105° C. until the weight of the filter no longer changes. The increase in weight of the filter represents the total suspended solids. TSS can also be measured by analyzing for total solids (TS) and subtracting total dissolved solids (TDS).

Various wastewater treatment systems and methods of treating wastewater are available in the marketplace. Some of these are extolled as substantially reducing the TSS, TN, and/or BOD in wastewater effluent. As used herein, the term "effluent" (e.g., wastewater effluent) refers to the liquid aqueous material discharged from the wastewater treatment system, back into the surrounding environment. In one example, the effluent would be the liquid aqueous material drained from the wastewater treatment system through a pipe and into a nearby creek.

One system showing reductions in TSS, TN, and BOD is the Aerocell Self Contained Advance Treatment System, sold by Quanics, Inc. ("the Quanics System"), advertises a 5-day BOD of 2 mg/L, TSS of 2 mg/L, and a TN or 9 mg/L. This system is certified by the NSF under ANSI Standard 40.

Standard 40 is for residential wastewater treatment systems having rated capacities between 400 gallons (1514 Liters) and 1500 gallons (5678 Liters) per day. Accordingly, the Quanics system would be expected to demand at least 3028 mg/day of oxygen from the surrounding environment. The system should also be expected to release about 3 grams/day of TSS, about 15 grams/day of TN, and about 1500 kilograms/day of water into the surrounding environment through effluent.

Quanics also offers a Bio-COIR system, which is advertised as providing a 5-day BOD of 9 mg/L, TSS of 12 mg/L, and a TN or 17 mg/L.

While the commercial systems available on the market reduce BOD, TSS, and TN, they still release contaminants that demand oxygen from the environment. These systems release some nitrogenous waste and some phosphorous waste. They also release solid waste material into the environment. They release large quantities of water into the environment.

Releasing oxygen-demanding contaminants into the environment is particularly undesirable in wetland areas. The oxygen demanded by wastewater contaminants lessens the oxygen available for wildlife.

Releasing nitrogenous waste into the environment is also particularly undesirable in wetland areas. Such nitrogenous compounds (e.g., nitrates and nitrites) can feed certain types of organisms, which leads to overpopulation of those organisms.

Despite advances in the wastewater treatment arts, a continuing need exists for reducing BOD, TN, and TSS in effluent wastewater.

As noted above, many wastewater treatment systems produce a substantial quantity of liquid water waste. In some circumstances it is desirable to reduce the amount of water drained into the surrounding area. Accordingly, the wastewater treatment arts also have a need for systems and methods providing for reducing the amount of liquid water discharged.

BRIEF DESCRIPTION OF THE DRAWINGS

FIG. 1 also shows that the material within the second compartment of the second septic tank is allowed to flow into another compartment, equipped with a pump, which pumps the material to a distribution box and leaching system.

FIG. 4 also shows how water that is not evaporated is directed back to the evaporation storage tank.

FIG. 5 shows an exemplary embodiment of a residential wastewater treatment system with an outdoor biofilter cabinet. The depicted wastewater treatment incorporates a chemical reservoir containing aluminum chlorohydrate.

FIG. 6 shows an exemplary embodiment of a residential wastewater treatment system with an indoor biofilter cabinet. The depicted wastewater treatment incorporates a chemical reservoir containing aluminum chlorohydrate.

DETAILED DESCRIPTION

Figure 1:
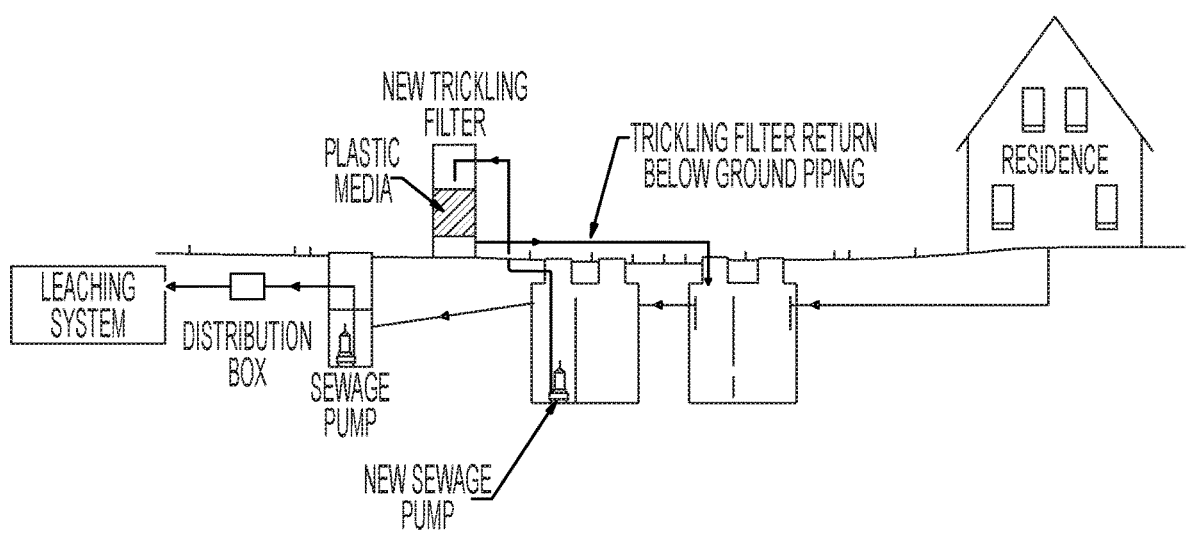
FIG. 1 shows an exemplary embodiment of a wastewater treatment system. In that example, the wastewater from the residence flows into the first compartment of a septic tank, where the sludge is separated from the clarified water based on density. As indicated by the arrows, the clarified water flows into a second septic tank. As shown, the water is pumped from the second compartment of the second tank, onto a media. The water flows through the media into the drain, which returns the filtered water into the second compartment of the first septic tank via a pipe.

Improved methods of treating wastewater and wastewater treatment systems have now been discovered. Notably, the methods and systems provide benefits in reducing BOD, TN, Phosphorous, and TSS in effluent wastewater.

Applicant has invented a method of treating wastewater comprising: Directing the flow of wastewater to a Density Separation Tank at Rate1; Separating wastewater by density into Portion A and Portion B; and Circulating Portion B through at least one Media at Rate2; Wherein the ratio of Rate2:Rate1 is greater than 1.

As used herein, the term "Directing" refers moving wastewater towards a particular place. In one embodiment, the wastewater is directed into the Density Separation Tank by way of a conduit such as a pipe. For example, wastewater may be collected from various toilets and drains and then moved through a pipe to a Density Separation Tank. The movement may be accomplished by gravitational force (where the Density Separation Tank is lower in elevation than the sources of wastewater) or the movement may be accomplished by using a pump or other device for actively transporting the wastewater.

As used herein, the term "Density Separation Tank" means a vessel in which wastewater is partitioned into different portions according to their relative densities. One example of a Density Separation Tank is a vessel having a raised dividing wall, separating the vessel into chambers, wherein the influent solid matter sinks to the bottom without passing over the dividing wall, thereby separating the influent wastewater into portions having different densities. One specific example of a Density Separation Tank is a septic tank.

"Influent" refers to the material entering the wastewater treatment system.

"Rate1" refers to the rate that influent wastewater enters the wastewater treatment system. Rate1 can be expressed in units of volume divided by units of time. For example, Rate1 can be expressed as gallons per year, in one example, Rate1 is about the same as the rate that water is used and/or discarded in a house or dwelling.

"Separating" means dividing a particular amount of mass into more than one portion, each portion having less mass than the original amount. Where influent wastewater is separated by density into a Portion A and a Portion B, Portion A means the more dense of these two portions and Portion B means the less dense of these two portions.

"Circulating" means directing a volume of material through a path with at least some of that volume returning to its original place. Circulating Portion B includes, for example, pumping Portion B from a vessel through one or more Media, and then draining the one or more Media into the original vessel.

"Rate2" refers to the rate at which Portion B circulates through the one or more media. Rate2 can be expressed in units of volume divided by units of time. In one example, the ratio of Rate2:Rate1 is greater than 5. In another example, the ratio of Rate2:Rate1 is greater than 25. In another example, the ratio of Rate2:Rate1 is greater than 30. In another example, the ratio of Rate2:Rate1 is greater than 40. In another example, the ratio of Rate2:Rate1 is greater than 50. In another example, the ratio of Rate2:Rate1 is greater than 65. In another example, the ratio of Rate2:Rate1 is greater than 80. In another example, the ratio of Rate2:Rate1 is greater than 100. In another example, the ratio of Rate2:Rate1 is greater than 125. In another example, the ratio of Rate2:Rate1 is greater than 150. In another example, the ratio of Rate2:Rate1 is greater than 200. In another example, the ratio of Rate2:Rate1 is greater than. In another example, the ratio of Rate2:Rate1 is greater than 500.

The Circulating described above may be either uninterrupted circulating or intermittent circulating. Uninterrupted circulating means that the volume of Portion B moves continuously through the one or more Media, substantially free from periods where volume of Portion B does not circulate through the one or more media. By contrast the Circulating may be intermittent. Intermittent circulating means that the movement of Portion B periodically stops so that sometimes the volume of Portion B is moving through the one or more media and sometimes it is not.

Intermittent circulating may be accomplished, for example, by equipping a pump with a repeat cycle timer. In one case, the material of Portion B is moved through the one or more media with a pump that is connected to a repeat cycle timer. The repeat cycle time controls whether the pump is on or off. The repeat cycle timer can be adjusted to control the frequency and duration of each of the on and off periods.

As used herein, the term "On:Off Ratio" means the ratio of time that Portion B is moving through the one or more media (e.g., when the pump is on) divided by the amount of time that the Portion B is not moving through the one or more media (e.g., when the pump is off).

In one embodiment the On:Off Ratio is less than about 1:1. In one embodiment, the On:Off Ratio is between about 1:1 and about 2:1. In one embodiment, the On:Off Ratio is between about 2:1 and about 4:1. In one embodiment, the On:Off Ratio is between about 4:1 and about 8:1, such as, for example 5:1. In one embodiment, the On:Off Ratio is between about 8:1 and about 20:1. In one embodiment, the On:Off Ratio is between about 20:1 and about 50:1. In one embodiment, the On:Off Ratio is between about 50:1 and about 250:1. In one embodiment, the On:Off Ratio is between about 250:1 and about 1000:1.

The term Media means a solid porous structure that is capable of supporting biomass. In one embodiment, the media is made of plastic, such as PVC. In one embodiment, the media is a cross-flow media. In one embodiment, each sheet of the media is corrugated at a 60° angle from the horizontal and assembled in a cross-corrugated pattern with adjacent sheets. In one embodiment, the media has a 95% void-to-volume ratio. In one embodiment the media is about 110 to 130 $ft^2$ per ft3. In one embodiment, the media is about 119 $ft^2$/ft. In one embodiment, the media is a trickling media, i.e., the aqueous material passes through and is distributed throughout the media under the force of gravity.

In one embodiment, the Media is maintained at a temperature of greater than 0 0c. In another embodiment, the Media is maintained at a temperature of greater than 5° C. In another embodiment, the Media is maintained at a temperature of greater than 10° C. In another embodiment, the Media is maintained at a temperature of greater than 15° C. In another embodiment, the Media is maintained at a temperature of greater than 20° C. In another embodiment, the Media is maintained at a temperature of greater than 25° C. In another embodiment, the Media is maintained at a temperature of greater than 30° C.

In one embodiment, the Media is maintained at a particular temperature or temperature range by insulating the Media, for example in an enclosure, such as a cabinet. In one embodiment, the Media is maintained at a particular temperature or temperature range by ventilating the Media. In one embodiment, the Media is maintained at a particular temperature or temperature range by heating the Media with a heater. Heating the Media can be accomplished either be heating the media directly, or heating the surrounding environment, e.g., by heating the air surrounding the Media within a contained space.

In one embodiment, the material of Portion B is delivered to the Media by spraying it onto the media. As used herein, "spraying" means creating a multitude of droplets from a relatively more contiguous liquid. For example, one may spray the material of Portion B by pumping it through one or more nozzles, which transform the Portion B from a relatively more contiguous liquid form into a relatively more dispersed form.

In one embodiment, Portion B is sprayed onto the media through one or more nozzles. As used herein, the term "nozzle" means a mechanical device designed to control the direction or characteristics of a fluid flow as it exits an enclosed chamber or pipe via an orifice.

In one example, the spraying Portion B includes pumping Portion B through one or more nozzles, each producing a full cone having an angle of greater than 100 degrees. The term "full cone" refers to a cone-shaped pattern of water, wherein the water is distributed rather evenly throughout the entire cone instead of concentrating the spray primarily at the edges of the cone-shaped pattern of water.

In another example, the spraying Portion B includes producing a full cone having an angle of between 80-180 degrees. In another example, the spraying Portion B includes producing a full cone having an angle of between of between 90-150 degrees. In another example, the spraying Portion B includes producing a full cone having an angle of between of between 100-130 degrees. In another example, the spraying Portion B includes producing a full cone having an angle of between of between 105-125 degrees.

In one embodiment, the method of treating wastewater comprises returning a fraction of Portion B to the Density Separation Tank, e.g., the first compartment of a first septic tank. For example, in one embodiment, a wastewater treatment system comprises two two-chamber septic tanks in series and some of the circulating matter of Portion B is directed to the first chamber of the first septic tank. Applicant has determined that directing a fraction of the recirculating Portion B into the density separation tank results in a lowering of TN because it provides a source of oxygen for microbial respiration.

Figure 1A:
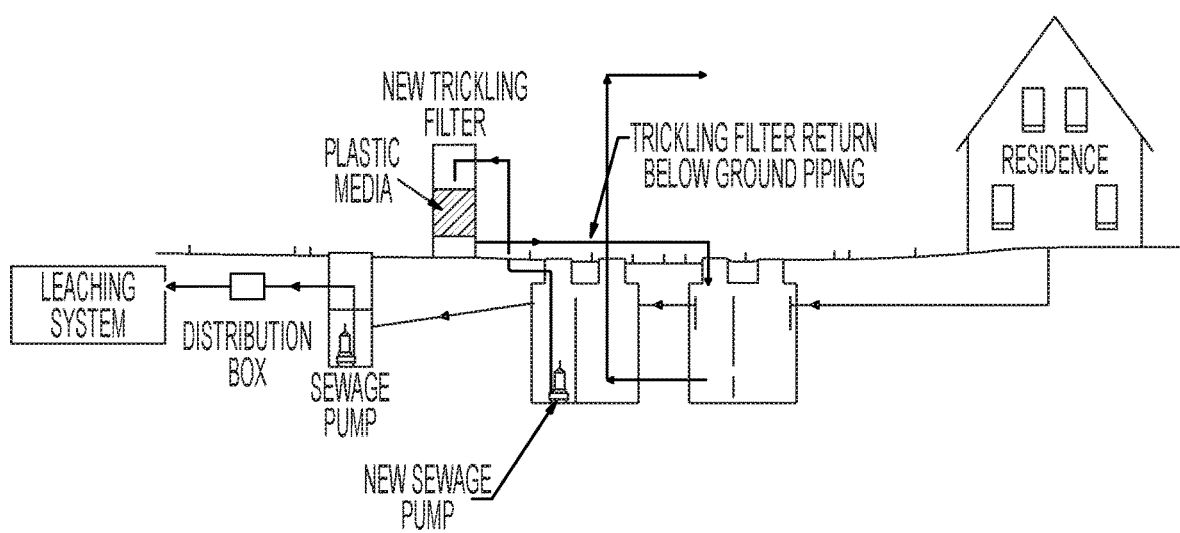
FIG. 1A shows an exemplary embodiment of a wastewater treatment system. In that example, the wastewater from the residence flows into the first compartment of a septic tank, where the sludge is separated from the clarified water based on density. As indicated by the arrows, the clarified water flows into a second septic tank, where it is pumped to both the media and the first compartment of the first septic tank. The water flows through the media into the drain, which returns the filtered water into the second compartment of the first septic tank via a pipe.
Figure 2:
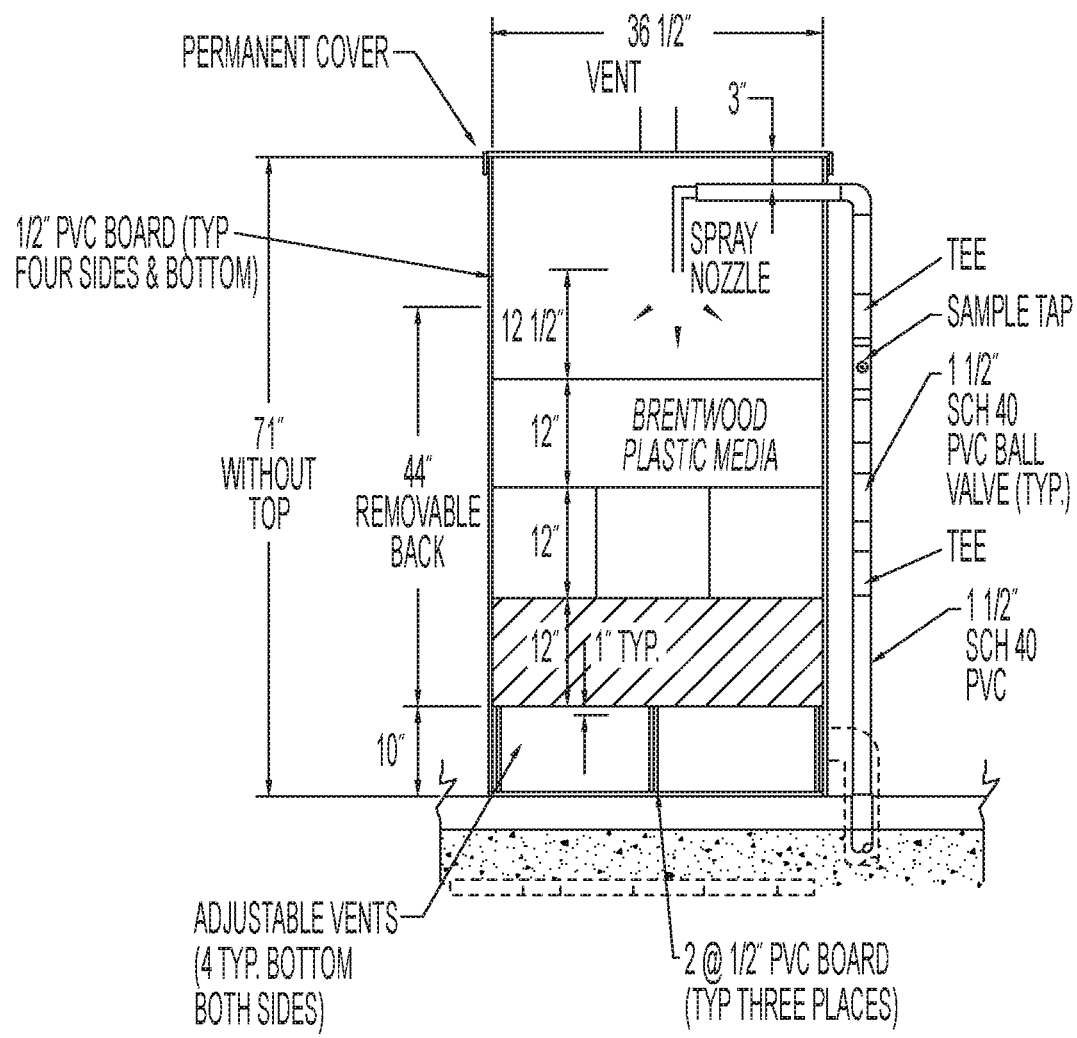
FIG. 2 shows an exemplary Biofilter cabinet. In this example, the spray nozzle is shown to distribute circulating wastewater in a conical pattern onto the media. (The angle shown is not intended to represent the actual cone angle of the spraying). This example also shows an aeration system (vent) for providing fresh air to the cabinet housing the media. This example also shows a drain pipe, which returns the filtered water to the circulating volume.
Figure 3:
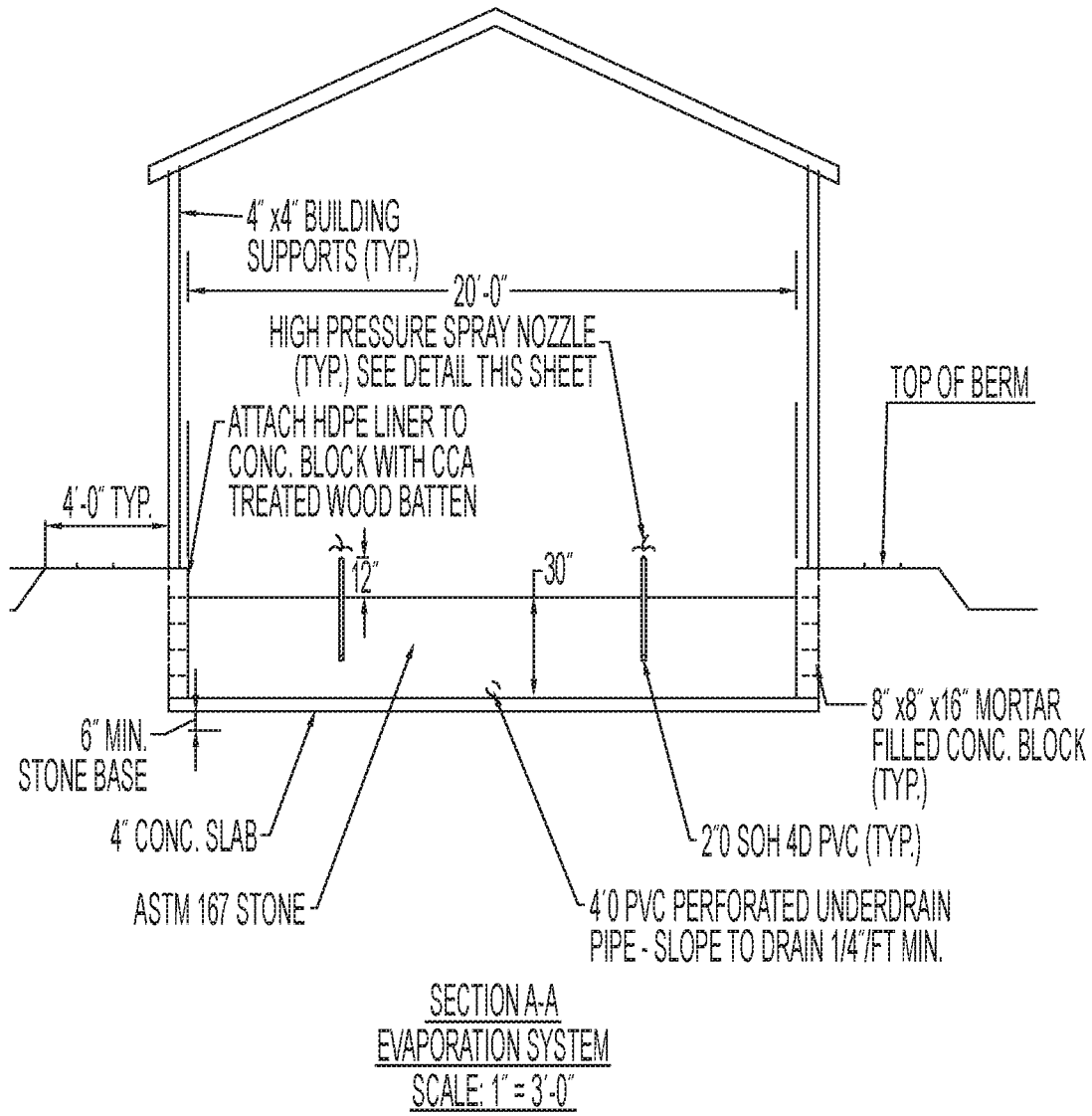
FIG. 3 shows another view of an exemplary Evaporator. The spray nozzles shown in this drawing are used as Misters. The number of spray nozzles shown in FIG. 3 is not intended to represent the actual number of nozzles, which may vary. The Evaporator shown in FIG. 3 also illustrates how the base of the Evaporator may be separated from the surrounding environment with a water-impermeable barrier, so that all liquid water falling to the base returns to the evaporation storage tank via the drain, instead of seeping into the surrounding environment.
Figure 4:
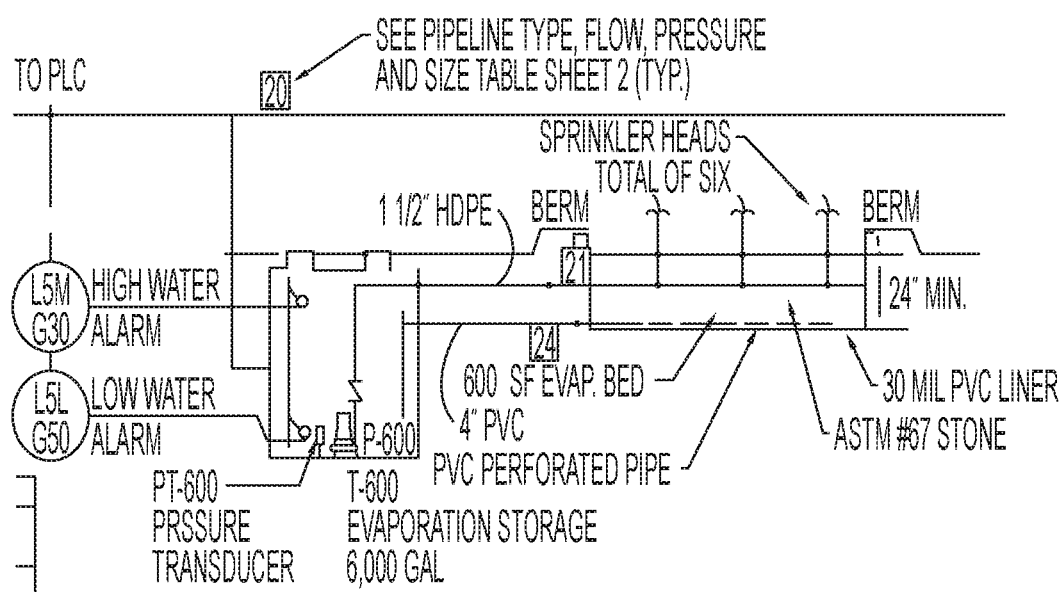
FIG. 4 shows an example of an Evaporator having six Misters (sprinkler heads in this example) attached to a 6000 gallon evaporation storage tank. The bolded arrows in FIG. 4 show how a well pump directs the water from the evaporation storage tank up through the Misters.

FIG. 1A shows an exemplary embodiment in which wastewater is directed to a density separation tank, where it is separated into a Portion B, which is both recirculated and also fed back into the first compartment of the first septic tank. In one embodiment, the flow rate directed to the first chamber of the first septic tank is from about 1% to about 10% of the flow rate of the recirculating Portion B. In another embodiment, the flow rate directed to the first chamber of the first septic tank is from about 2% to about 5% of the flow rate of the recirculating Portion B.

In one embodiment of the method of treating wastewater, a Portion C is separated from Portion B. The Portion C may be separated form Portion B by directing the flow of Portion B into a separate container.

In one embodiment, the method of treating wastewater comprises adding an Antimicrobial to Portion C. As used herein, the term "Antimicrobial" means a substance that kills or inhibits the growth of microorganisms such as bacteria, fungi, or protozoans. In one example, the antimicrobial is an oxidizing agent. In one example, the Antimicrobial is a chlorinating agent. In one embodiment the Antimicrobial is chlorine. In one embodiment, the Antimicrobial is a hypochlorite salt, such as sodium or calcium hypochlorite. In one embodiment, the Antimicrobial is UV light, i.e., Portion C is treated with UV light by exposing it to a UV lamp.

In one embodiment, the method of treating wastewater comprises adding a Reducing Agent. As used herein, the term Reducing Agent means a molecule capable of donating one or more electrons to another compound, for example, sodium sulfite, sodium bisulfite, and/or sodium metabisulfite.

In one embodiment, the Reducing Agent is added to Portion C. In one embodiment, the Reducing Agent is added to Portion C after the Antimicrobial is added to Portion C. In one embodiment, the Reducing Agent is sulfite or hydrogen sulfite or a salt of either.

In one embodiment, the method of treating wastewater comprises filtering Portion C. In one example, the filtering removes materials having a size greater than about 5 microns. In another example, the filtering removes materials having a size greater than about 1 micron. In another example, the method of treating wastewater includes more than one filtering step. For example, the filtered water may be first filtered to remove materials having a size greater than about 5 microns and thereafter filtered to remove materials having a size of greater than about 1 micron.

In one embodiment, the wastewater treatment system comprises a carbon filter. In one embodiment, the carbon filter is a powdered block filter. In one embodiment, the carbon filter is a granular activated filter, in one embodiment, the carbon filter includes a bacterial growth inhibitor, such as silver, copper, and/or zinc.

In one embodiment, the wastewater treatment system comprises separating Portion D from Portion C by applying pressure to Portion C across a Reverse Osmosis Membrane.

In one embodiment, the method of treating wastewater comprises evaporating water. In one embodiment, water is evaporated from Portion C. In one embodiment, water is evaporated from Portion 8. In one embodiment, water is evaporated from Portion D. The term "Evaporative Rate," as used herein, means the rate at which water leaves the wastewater treatment system in the gaseous or suspended (e.g., liquid water suspended in the air) form. The Evaporative Rate can be expressed in units of volume divided by units of time, wherein the volume refers to the amount of water measured in the liquid form. For example, in one embodiment, the Evaporative Rate is less than 10,000 gallons per year. In another exemplary embodiment, the Evaporative Rate is between about 10,000 and about 50,000 gallons per year. In another exemplary embodiment, the Evaporative Rate is between about 50,000 and about 150,000 gallons per year. In another exemplary embodiment, the Evaporative Rate is between about 150,000 and about 300,000 gallons per year. In another exemplary embodiment, the Evaporative Rate is between about 300,000 and about 1,000,000 gallons per year. In another exemplary embodiment, the Evaporative Rate is greater than 1,000,000 gallons per year.

In one embodiment, water is evaporated by misting the water. As used herein, the term "misting" means converting liquid aqueous material into fine droplets, having a surface area greater than the original liquid. This may be accomplished, for example, by pushing the liquid aqueous material through one or more nozzles.

In one embodiment, water is evaporated by blowing air through the space having the water to be evaporated. This blowing may be accomplished, for example, by using one or more fans. In some circumstances, this blowing may be accomplished by harnessing the natural wind currents. For example, the water may be evaporated by misting water into a well ventilated structure, such as a tobacco barn. The blowing may occur at different temperatures, depending on the evaporative requirements. In one embodiment, the blowing air is heated to increase the rate of evaporation.

In one embodiment, the Evaporative Rate is more than 75% of Rate1. In another embodiment, the Evaporative Rate is more than 80% of Rate1. In another embodiment, the Evaporative Rate is more than 85% of Rate1. In another embodiment, the Evaporative Rate is more than 90% of Rate1. In another embodiment, the Evaporative Rate is more than 95% of Rate1. In another embodiment, the Evaporative Rate is more than 99% of Rate1. In another embodiment, the Evaporative Rate is more than 99.9% of Rate1. In another embodiment, the Evaporative Rate exceeds Rate1.

In one embodiment, the method of treating wastewater comprises heating Portion A. As used herein, the term "heating" means adding thermal energy to the object heated. The heating may be accomplished by devices known to produce thermal energy, such as gas burners, electric resistors, etc. In one embodiment, the heating is accomplished by capturing solar energy. For example, in one embodiment, the heating is achieved by using a translucent window to permit incoming solar radiation to enter the system. Once inside the system, the light energy gives rise to thermal energy, thereby heating the system. For example, in one embodiment, Portion A is heated by allowing incoming solar radiation to enter the Density Separation Tank.

In one embodiment, the method of treating wastewater comprises heating Portion B.

In one embodiment, the method of treating wastewater comprises heating Portion C.

In one embodiment, the method of treating wastewater comprises heating Portion D.

In one embodiment, the method of treating wastewater comprises adding a metal salt coagulant to Portion A and/or Portion B. In one embodiment, the method of treating wastewater comprises adding an inorganic aluminum salt to Portion A and/or Portion B. In one embodiment, the method of treating wastewater comprises adding an inorganic ferric salt to Portion A and/or Portion B. In one embodiment, the method of treating wastewater comprises adding a metal salt coagulant to Portion A and/or Portion B without substantially raising or lowering the pH of Portion A and/or Portion B. In one embodiment, the method of treating wastewater comprises adding a compound of the chemical formula $Al_nCl_{3n-m}(OH)_m$ to Portion A and/or Portion B. In one embodiment, the metal salt coagulant (e.g., $Al_nCl_{3n-m}(OH)_m$) is added to Portion A by flushing the metal salt coagulant down a toilet emptying into Portion A. In another embodiment, the metal salt coagulant (e.g., $Al_nCl_{3n-m}(OH)_m$) is added directly into the house sewer pipe without passing through the toilet.

By adding $Al_nCl_{3n-m}(OH)_m$ to the wastewater as described above, the phosphorous levels of the effluent wastewater can be dramatically reduced. In one embodiment, about 60 milligrams of $Al_nCl_{3n-m}(OH)_m$ is added to the toilet or sewer pipe each day, resulting in a reduction in the phosphorous level to about 1.5 mg/L. The appropriate amount of $Al_nCl_{3n-m}(OH)_m$ can be determined by monitoring the phosphorous levels in the household's effluent—adding more $Al_nCl_{3n-m}(OH)_m$ to mittigate against higher than desired phosphorous levels.

In one embodiment of the method of treating wastewater, the Biological Oxygen Demand in Portion C is less than 5% of that in the wastewater directed into Portion A.

In one embodiment of the method of treating wastewater, the Total Suspended Solids in Portion C is less than 10% of that in the wastewater directed into Portion A.

In one embodiment of the method of treating wastewater, the Total Nitrogen in Portion C is less than 25% of that in the wastewater directed into Portion A.

In one embodiment, the Total Kjeldahl Nitrogen in the effluent is less than 10% of that in the wastewater directed into Portion A.

In one embodiment, the Biological Oxygen Demand in the effluent is less than 5% of that in the wastewater directed into Portion A.

In one embodiment, the Total Suspended Solids in the effluent is less than 10% of that in the wastewater directed into Portion A. In one embodiment, the Total Suspended Solids in the effluent is less than 5% of that in the wastewater directed into Portion A. In one embodiment, the Total Suspended Solids in the effluent is less than 2.5% of that in the wastewater directed into Portion A. In one embodiment, the Total Suspended Solids in the effluent is less than 1% of that in the wastewater directed into Portion A. In one embodiment, the Total Suspended Solids in the effluent is less than 0.1% of that in the wastewater directed into Portion A.

In one embodiment, the Total Nitrogen in the effluent is less than 25% of that in the wastewater directed into Portion A. In one embodiment, the Total Nitrogen in the effluent is less than 5% of that in the wastewater directed into Portion A. In one embodiment, the Total Nitrogen in the effluent is less than 1% of that in the wastewater directed into Portion A. In one embodiment, the Total Nitrogen in the effluent is less than 0.1% of that in the wastewater directed into Portion A.

In one embodiment, the Total Kjeldahl Nitrogen in the effluent is less than 10% of that in the wastewater directed into Portion A. In one embodiment, the Total Kjeldahl Nitrogen in the effluent is less than 1% of that in the wastewater directed into Portion A. In one embodiment, the Total Kjeldahl Nitrogen in the effluent is less than 0.1% of that in the wastewater directed into Portion A.

In one embodiment the BOD of the effluent is less than 100 grams per year. In one embodiment the BOD of the effluent is less than 10 grams per year. In one embodiment the BOO of the effluent is less than 1 gram per year.

In one embodiment the TSS of the effluent is less than 100 grams per year. In one embodiment the TSS of the effluent is less than 10 grams per year. In one embodiment the TSS of the effluent is less than 1 gram per year.

In one embodiment the TN of the effluent is less than 100 grams per year. In one embodiment the TN of the effluent is less than 1O grams per year. In one embodiment the TN of the effluent is less than 1 gram per year.

In one embodiment the amount of aqueous effluent is less than 100,000 gallons per year. In one embodiment the amount of aqueous effluent is less than 10,000 gallons per year. In one embodiment the amount of aqueous effluent is less than 1,000 gallons per year. In one embodiment the amount of aqueous effluent is less than 100 gallons per year. In one embodiment the amount of aqueous effluent is less than 10 gallons per year. In one embodiment the amount of aqueous effluent is less than 1 gallon per year.

Applicant has also invented a wastewater treatment system comprising: a Wastewater Inlet; a First Vessel; a Second Vessel; a Pump equipped with a Repeat Cycle Timer; a Spraying Nozzle; and a Media.

As used herein, the term "Wastewater Inlet" means a structure or conduit that carries the flow of wastewater, delivering that wastewater to a particular place. For example, in one embodiment, the Wastewater Inlet is a drainpipe carrying the flow of toilet and/or drain water from a residence.

[The First Vessel is a container that is substantially impermeable to water along its structural barriers. In one embodiment, the First Vessel is made of polymers (e.g., plastic or natural materials), metal, and/or minerals (e.g., rock and concrete). In one embodiment the First Vessel is made of concrete, polyethylene or fiberglass. In one embodiment, the First Vessel has a volume of between about 1000 gallons to about 2000 gallons. In one embodiment, the First Vessel has a volume of between about 2000 gallons to about 3000 gallons. In one embodiment, the First Vessel has a volume of between about 3000 gallons to about 5000 gallons. In one embodiment, the First Vessel has a volume of greater than 5000 gallons. In one embodiment, the First Vessel is a conventional septic tank.

The Second Vessel is a container that is substantially impermeable to water along its structural barriers. In one embodiment, the Second Vessel is made of polymers (e.g., plastic or natural materials), metal, and/or minerals (e.g., rock and concrete). In one embodiment the Second Vessel is made of concrete, polyethylene or fiberglass. In one embodiment, the Second Vessel has a volume of between about 1000 gallons to about 2000 gallons. In one embodiment, the Second Vessel has a volume of between about 2000 gallons to about 3000 gallons. In one embodiment, the Second Vessel has a volume of between about 3000 gallons to about 5000 gallons. In one embodiment, the Second Vessel has a volume of greater than 5000 gallons. In one embodiment, the Second Vessel is a conventional septic tank.

In one embodiment, the wastewater treatment system described above comprises an Evaporator. As used herein, the term "Evaporator" means a device (or team of devices) that increases the rate at which liquid water transforms into gaseous water. This may be accomplished by increasing the surface area of the water, for example, by aerosolizing water. In one embodiment, the Evaporator includes at least one Mister. Liquid water may also be transformed into gaseous water by increasing the temperature of the water. This may be accomplished by heating the water, for example by employing one or more heaters. The rate at which liquid water evaporates may also be increased by increasing the rate at which unsaturated air circulates within the vicinity of the water. Increasing the circulation of air may be accomplished, for example, by equipping the Evaporator with one or more blowers, such as fans or the like.

In one embodiment, the Evaporator is equipped with a Mist Membrane. As used herein, the term "Mist Membrane" means a membrane of material that is more permeable to gaseous water than liquid water. In one embodiment, the Mist Membrane is plastic. In one embodiment, the Mist Membrane is a plastic screen. In one embodiment, the Mist Membrane is a rectangular prismatic structure with slatted wood, such as a tobacco barn. In one embodiment, the Mist Membrane is cloth.

In one embodiment, the wastewater treatment system described above comprises at least one Antimicrobial.

In one embodiment, the Antimicrobial comprises at least one Chlorinating Agent.

In one embodiment, the wastewater treatment system described above comprises at least one Filter.

In one embodiment, at least one Filter is a 5 micron filter. In one embodiment, at least one Filter is a 1 micron filter.

In one embodiment, at least one Filter is a submicron filter.

In one embodiment, the wastewater treatment system described above comprises at least one Reducing Agent.

In one embodiment, the wastewater treatment system described above comprises at least one carbon filter.

In one embodiment, the wastewater treatment system described above comprises at least one Reverse Osmosis Filter.

In one embodiment, the wastewater treatment system described above comprises at least one Heater.

In one embodiment, the Spraying Nozzle produces a spray angle of at least 100 degrees.

In one embodiment, the Repeat Cycle Timer directs the flow of aqueous materials intermittently through the Spraying Nozzle, onto the Media.

In one embodiment, the wastewater treatment system comprises an inorganic aluminum salt.

In one embodiment, the wastewater treatment system comprises a compound of the chemical formula $Al_nCl_{3n-m}(OH)_m$.

Although the present invention herein has been described with reference to various exemplary embodiments, it is to be understood that these embodiments are merely illustrative of the principles and applications of the present invention. Those having skill in the art would recognize that various modifications to the exemplary embodiments may be made, without departing from the scope of the invention.

Moreover, it should be understood that various features and/or characteristics of differing embodiments herein may be combined with one another. It is therefore to be understood that numerous modifications may be made to the illustrative embodiments and that other arrangements may be devised without departing from the scope of the invention.

It will be appreciated that there is an implied "about" prior to all numerical values recited herein, whether or not so stated. It should also be understood that the precise numerical values used in the specification and claims form additional embodiments. Efforts have been made to ensure the accuracy of the numerical values disclosed herein. Any measured numerical value, however, can inherently contain certain errors resulting from the standard deviation found in its associated measuring technique.

Furthermore, other embodiments of the invention will be apparent to those skilled in the art from consideration of the specification and practice of the invention disclosed herein. It is intended that the specification and examples be considered as exemplary only, with a scope and spirit being indicated by the claims.

Finally, it is noted that, as used in this specification and the appended claims, the singular forms "a," "an," and "the," include plural referents unless expressly and unequivocally limited to one referent, and vice versa. Thus, by way of example only, reference to "a composition" can refer to one or more compositions, and reference to "a salt of ascorbic acid" can refer to one or more salts of ascorbic acid. As used herein, the terms "comprise", "comprises", "comprising", "contain", "contains", "containing", "have", "having", "include", "includes", and "including" are intended to be non-limiting, such that recitation of an item or items is not to the exclusion of other like items that can be substituted or added to the recited item(s).

EXAMPLES

The following examples are illustrative only, and are not intended to be limiting of the invention, as claimed.

Example 1

A single-family residence was connected by pipe to a first, concrete, 1,500 gallon 2-compartment septic tank, allowing the separation of sludge, water, and other materials based o density. The clarified water flowed through from the first compartment of first septic tank into the second compartment of the first septic tank. That water was directed to the first chamber of a second, concrete, 1,500 gallon septic tank. The clarified water was allowed to flow from the first compartment of second septic tank into the second compartment of the second septic tank. The second septic tank was equipped with a submersible pump, which pumped the liquid from the second compartment of the second septic tank through a nozzle and onto 3 feet of PVC cross-flow trickling media acquired from Brentwood and Jaeger Industries. The liquid was allowed to trickle through the media into a drain. The rate of pumping/trickling/draining was adjusted from between 1 gallon per minute to 1O gallons per minute. The drain returned the liquid to the second compartment of the first septic tank. The liquid from the second compartment of the second septic tank was allowed to flow into a third vessel equipped with a pump. The liquid from the third vessel was pumped to a leaching system.

The water directed to the distribution box and leaching field was measured to have greater than 90% reduction of BOD, greater than 90% reduction of TSS, greater than 76% reduction of TN, and greater than 90% reduction of TKN.

Example 2

A residence was connected by pipe to a first 1,500 gallon, 2-compartment septic tank, allowing the separation of sludge, water, and other materials based on density. The clarified water flowed through from the first compartment of first septic tank into the second compartment of the first septic tank. That water was directed to the first chamber of a second, concrete, 1,500 gallon septic tank. The clarified water was allowed to flow from the first compartment of second septic tank into the second compartment of the second septic tank. The second compartment of the second septic tank was connected to a biofilter feed tank. The water from the biofilter feed tank was pumped through a nozzle and onto 3 feet of PVC cross-flow trickling media acquired from Brentwood Industries. The liquid flowing through the media was allowed to drain into the second compartment of the first septic tank, thereby circulating that portion of aqueous materials.

The biofilter feed tank was also connected to a series of separate tanks, equipped with separate sources of hypochlorite and sulfite. As an alternative to continued circulation, the aqueous materials from the biofilter tank could be subjected to chlorination (hypochlorite). Following chlorination, that aqueous material was filtered through a 5 micron filter, then a 1 micron filter, then a 0.9 micron (absolute) filter.

After filtering, that aqueous material was subjected to carbon filtering and a reducing agent (a sulfite salt) was added. After carbon filtering and reduction the aqueous material was directed to a reverse osmosis pump.

Following purification by reverse osmosis, the purified aqueous material was released as effluent into the external environment by way of a pipe extending into a nearby creek (Bungay Creek). This effluent was measured to have a BOD below the 2 mg/L detection limit, a TSS of less than 1 mg/L, a TN of less than 1 mg/L, a Total Phosphorous of less than 1 mg/L, and a TKN of less than 1 mg/L. The high-salt effluent from the reverse osmosis filtration was directed to the 6000 gallon tank.

Water directed to the 6000 gallon evaporation storage tank was thereafter pumped through six misters, allowing for the water to evaporate. Water that did not evaporate was allowed to fall by gravitational force, then drain via gravity through a PVC pipe, returning to the evaporation storage tank.

Using the above system, the average daily effluent of a household with an average daily flow of 250 gallons per day was reduced to approximately 0.03 gallons per day.

Example 3—Outdoor Biofilter Cabinet

Figure 5:
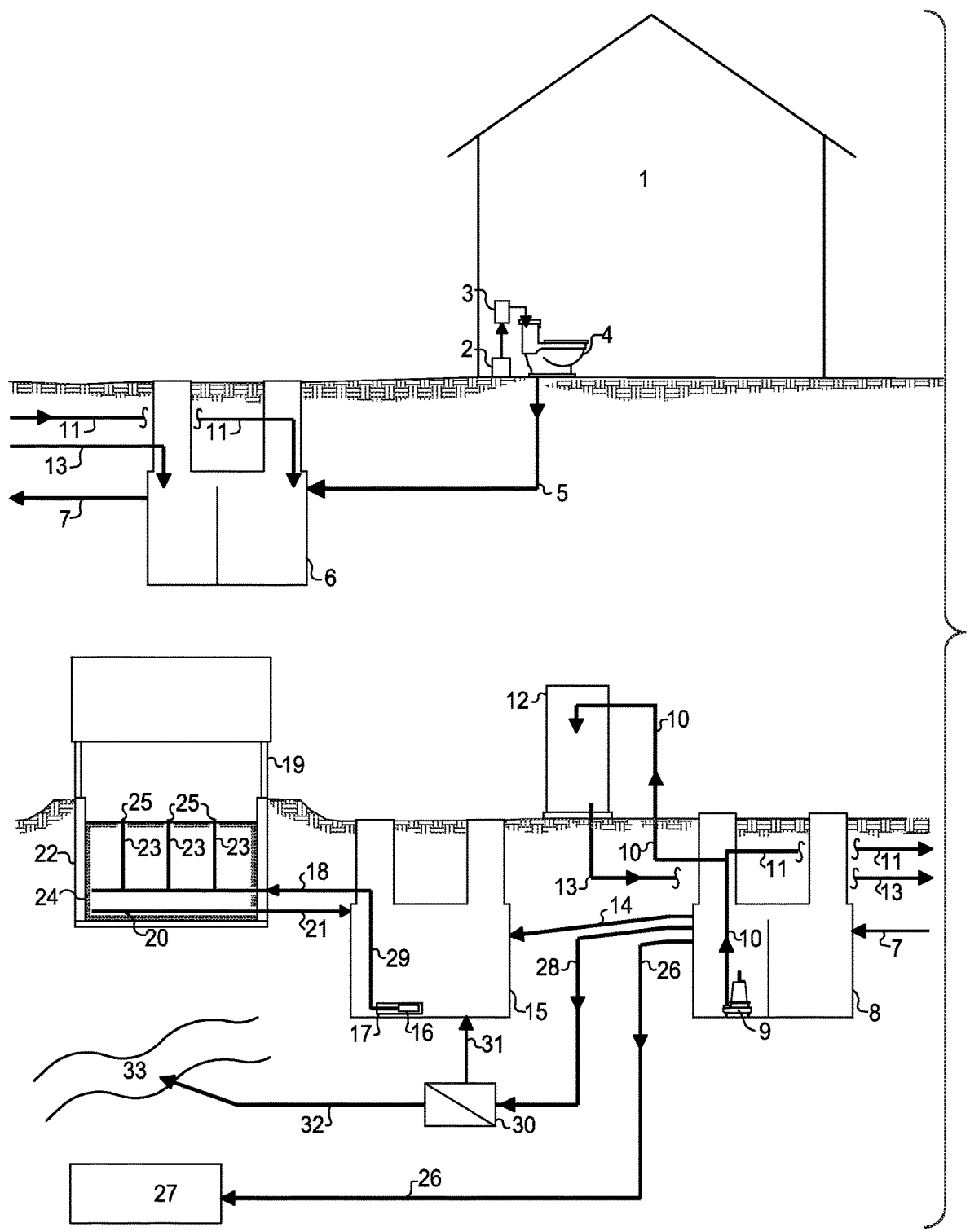
FIGS. 5 and 6 also shows how the Evaporator may include a Mist Membrane, forming a semi-permeable barrier around a 20'×30' area.

FIG. 5 shows an exemplary embodiment of a wastewater treatment system for a residence which incorporates a chemical reservoir containing aluminum chlorohydrate. In FIG. 5, a chemical reservoir containing aluminum chlorohydrate (2) in a residence or building (1) flows to chemical metering pump with programmable intermittent discharge (3) into house toilet (4) or directly into house sewer (5). Discharge from toilet (4) flows thru house sewer pipe (5) to two compartment Septic Tank #1 (6). Discharge from tank (6) thru 4" pipe (7) into two compartment Septic Tank #2 (8). ½, ¾, or 1 horsepower pump (9) in second compartment of Septic Tank #2 (8) pumps wastewater via 1, 1½, or 2" pipe (10) into Bio Filter (12). Optionally, pump (9) discharges concurrently via ¼, ½, or ¾" pipe (11) which originates in a Tee from pipe (10). Pipe (11) discharges to the inlet to Septic tank #1 (6). Discharge from Bio Filter (12) flows via 4" drain (13) returning to the second compartment of Septic Tank #1 (6).

The discharge from Septic Tank #2 (8) flows via 4" pipe (14) to equalization/holding tank (15), A 4" Well Pump (16) is encased in 6" pipe sleeve (17). The well pump (16) discharge is pumped to Evaporation Structure (19) via 2" flexible hose (29) connecting the well pump (16) to plastic pipe (18). A 4" perforated drain (20) located in Evaporation Structure (19) returns water not evaporated to tank (15). The perforated drain (20) transitions to solid 4" pipe (21) at the point where the perforated drain (20) exits the Evaporation Structure (19). The solid pipe (21) continues to tank (15). The Evaporation Structure (19) is a standard pole barn above a containment structure (22) constructed of masonry or other impervious material. Portions of pipe segments (18) and (20) and all of pipe (23) are located within the containment structure (22). The containment structure (22) is sufficiently deep to prevent the freezing of the pipes when it is filled with ¾" to 1" screened gravel or broken stone (24). According to the size of the Evaporation Structure, several ¼" to 1" riser pipes (23) extend from the buried influent pipe (18) to the surface to supply individual spray heads (25). The dimensions of the Evaporation Structure (19) in this example are 30 feet by 20 feet for a residence with an average monthly wastewater generation rate of 200 gallons per day or less. Greater wastewater flows require a proportionally larger area. The Evaporation Structure (19) may be open sided or enclosed. If the Evaporation Structure (19) is enclosed board siding shall be spaced a minimum of ¾ inch between vertical or horizontal boards in a manner similar to the construction of a tobacco barn. All wooden portions of the Evaporation Structure (19) are constructed using rot resistant and rust proof materials. The eaves of the Evaporation structure (19) are 14 feet above ground level. Within the evaporation structure, pipe (18) is located just above pipe (20). Both pipes are surrounded by ¾ to 1" stone to a depth sufficient to prevent pipe freezing.

Alternatively, Septic Tank (8) may drain via 4" pipe (28) to Reverse Osmosis system (30). It the Reverse Osmosis system (30) is at a higher elevation than septic tank #2 (8), the tag (28) may signify an appropriately sized pump and pump tank. Reject water from the reverse osmosis system drains via 2" or larger PVC pipe (31) to tank (15). Permeate from the reverse osmosis (30) is discharged via 1½ or 2" pipe (32) to surface water (33).

Alternatively, Septic Tank (8) may drain via 4" pipe (26) to standard leaching system (27).

Figure 10:
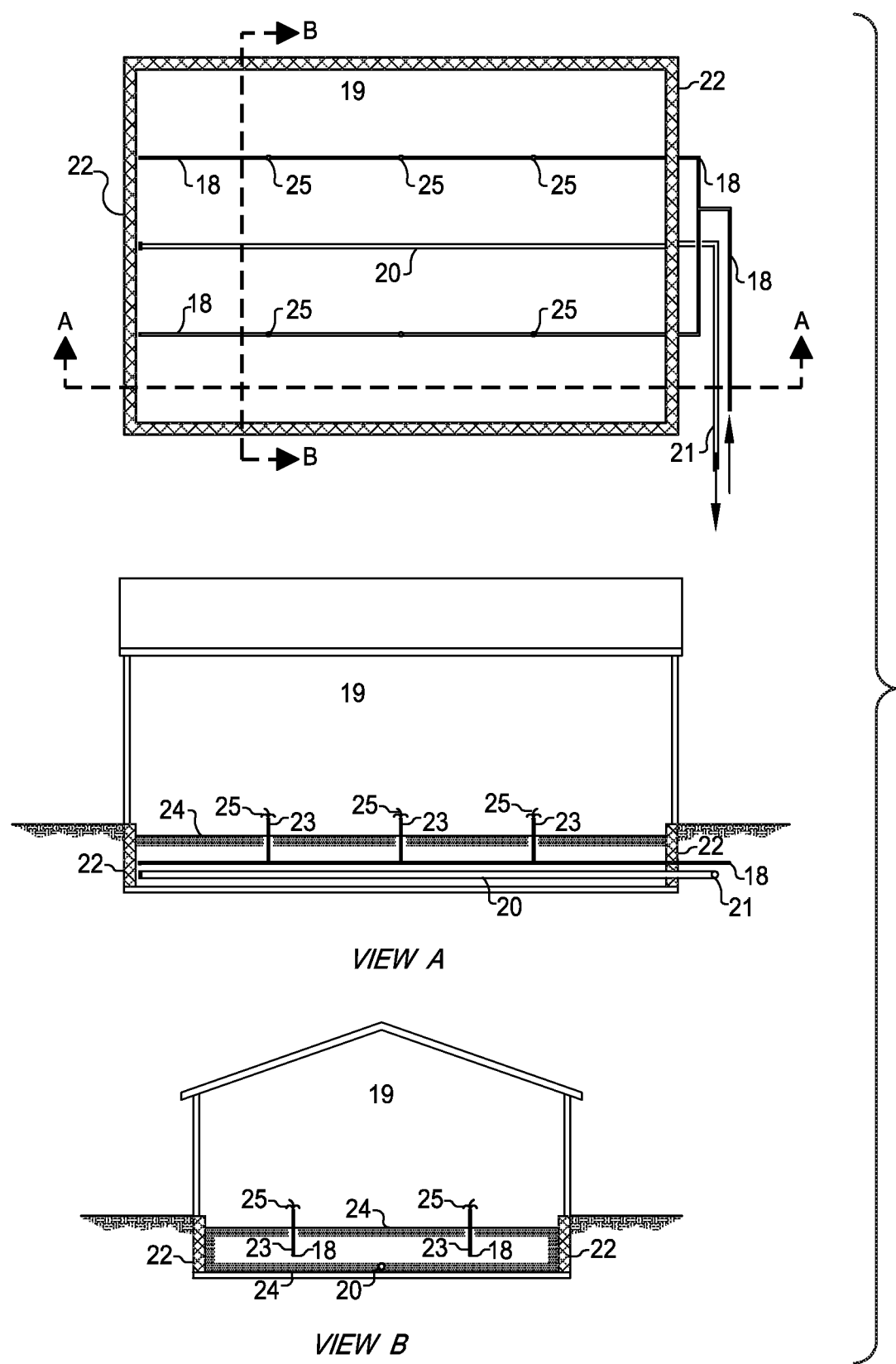
FIG. 10 shows alternative views of the evaporation structure (19) of FIG. 5.

FIG. 10 shows three views of the exemplified Evaporation structure.

Example 4—Indoor Biofilter Cabinet

Figure 6:
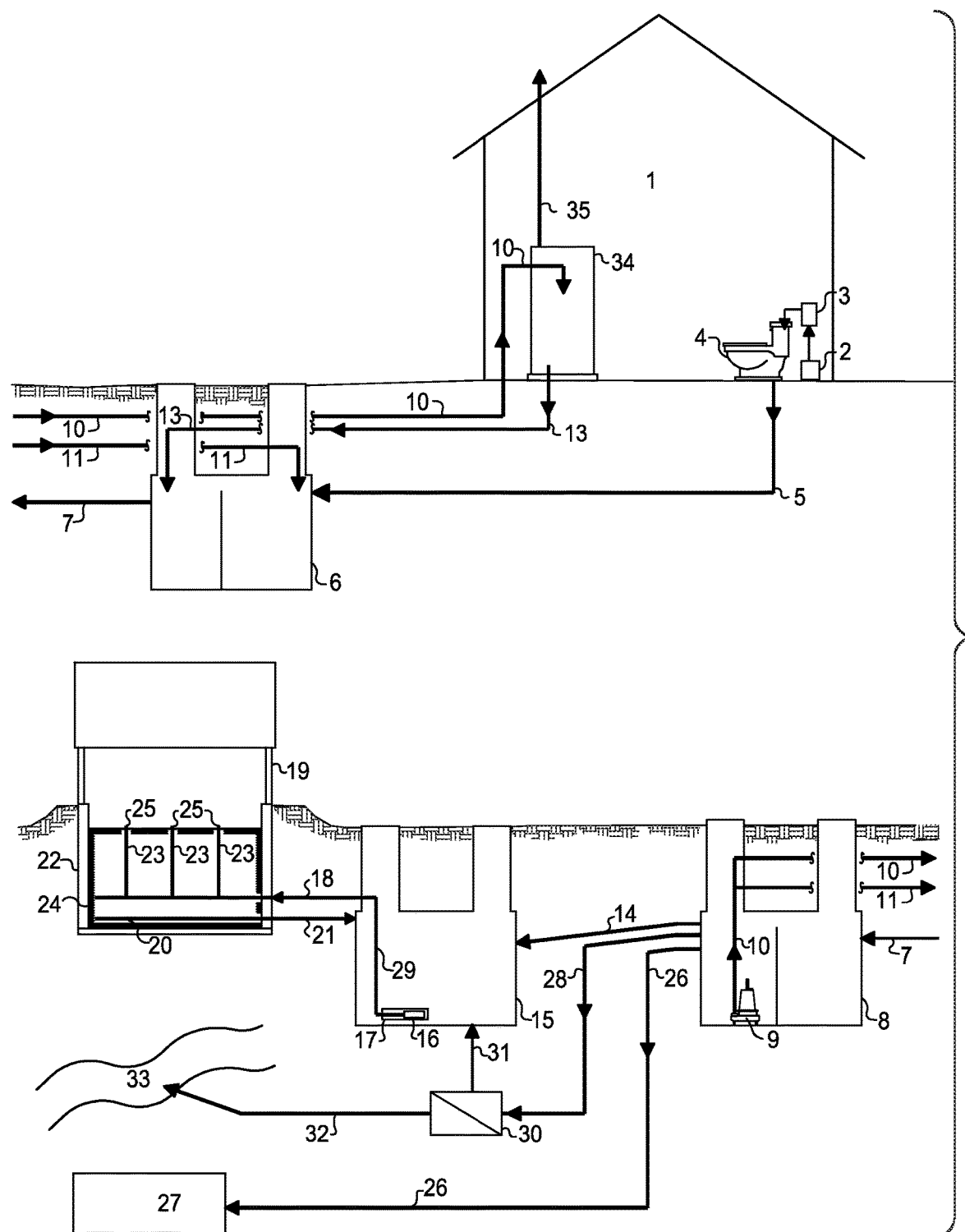

FIG. 6 depicts presents the same flow path as discussed in Example 3 (referencing FIG. 5), except that the biofilter (34) is located within the building. The biofilter (34) is vented by 4" or larger pipe (35) to a roof exhaust.

Example 5—Biofilter Details

Figure 7:
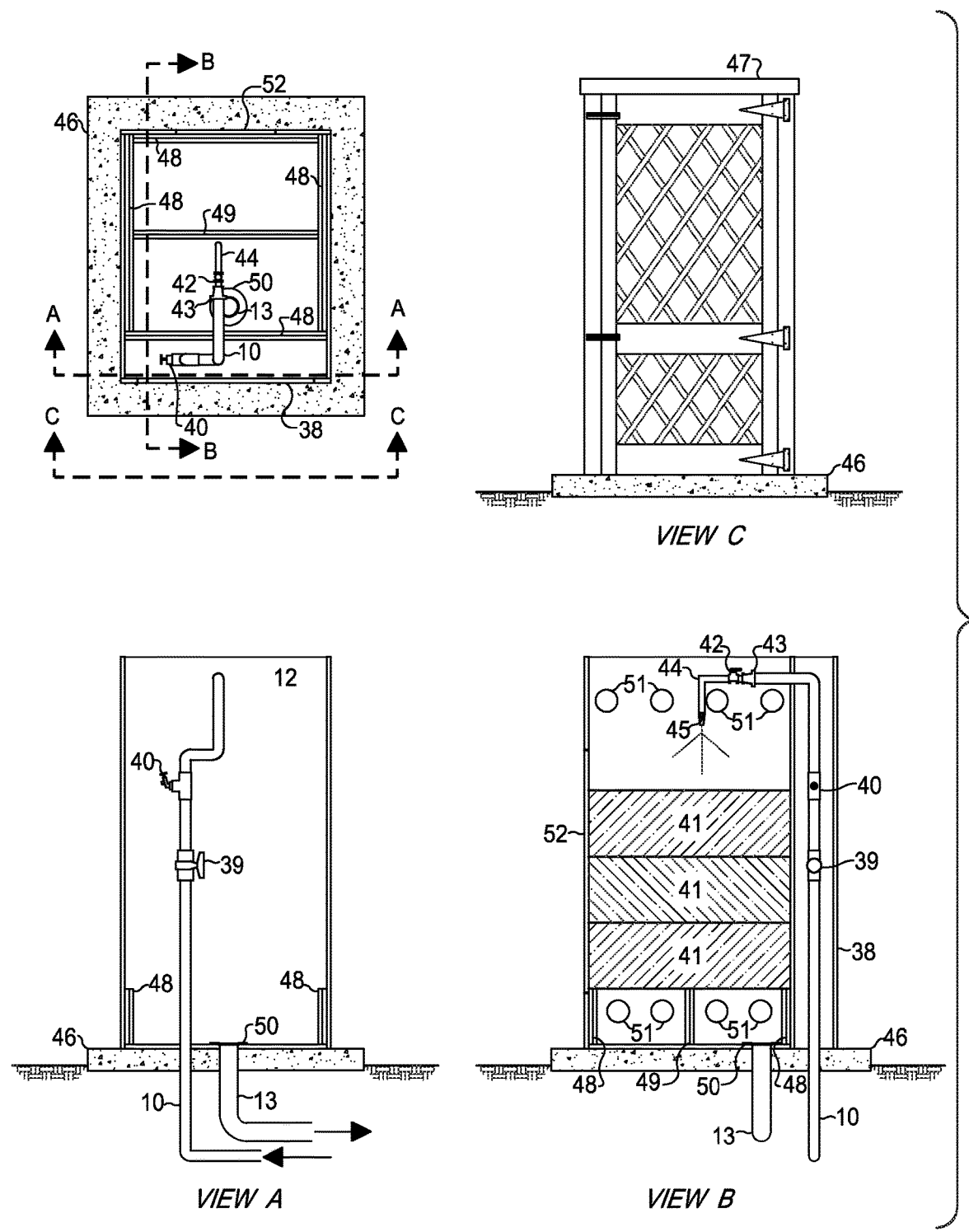
FIG. 7 shows an example of an outdoor biofilter cabinet.

FIG. 7 shows four views of a biofilter cabinet suitable for outdoor use and storage. In this example Biofilter (12) is a structure constructed using ¾" PVC board that is screwed together using stainless steel screws and whose joints are sealed with waterproof caulk. The structure has two chambers (36), (37'1. Chamber (37) is accessible by a door (38) and encloses the influent pipe (10) shut off valve (39) and sample tap (40). Chamber (36), the larger of the two, contains three layers of cross flow media (41), a segment of the influent feed pipe (10), a ¾" flow control gate valve (42), a pipe reducer (43), ¾" spray feed pipe (44), and a ½ or ¾" full cone spray nozzle (45) located above the midpoint of the chamber (36). The Biofilter (12) is positioned on a 4" wire reinforced concrete slab (46) and covered by a removable top (47) constructed with ¾" PVC board. Wood trim and lath are applied to the exterior of the plastic structure for aesthetic purposes (View C). Effluent from Septic Tank #2 (8) flows via 1, 1½ or 2" pipe (10) to the Biofilter (12). The feed pipe (10) is normally laid underground from the Septic Tank (8) to the Biofilter (12). The feed pipe (10) rises from below the ground surface within chamber (37) to an elevation just below the top cover (47) whence it turns 90 degrees and penetrates the wall of the Biofilter chamber (36). The full cone spray nozzle (45) sprays water onto 3 layers of crossflow plastic media (41). The plastic media (41) is supported off the floor of the chamber (36) by thickened sidewalls (48) and crosspieces (49) constructed using ¾" PVC sheet, A 4" floor drain (50) attached to pipe (13) is provided to return water to Septic Tank #1 (6). The Biofilter chamber is provided with adjustable ventilation holes (51) at the top and the bottom. A 44" high by 18" wide fixed access panel (52) is provided at the back of chamber (36) for the installation of the crossflow media (41).

Example 6—Indoor Biofilter Cabinet

Figure 8:
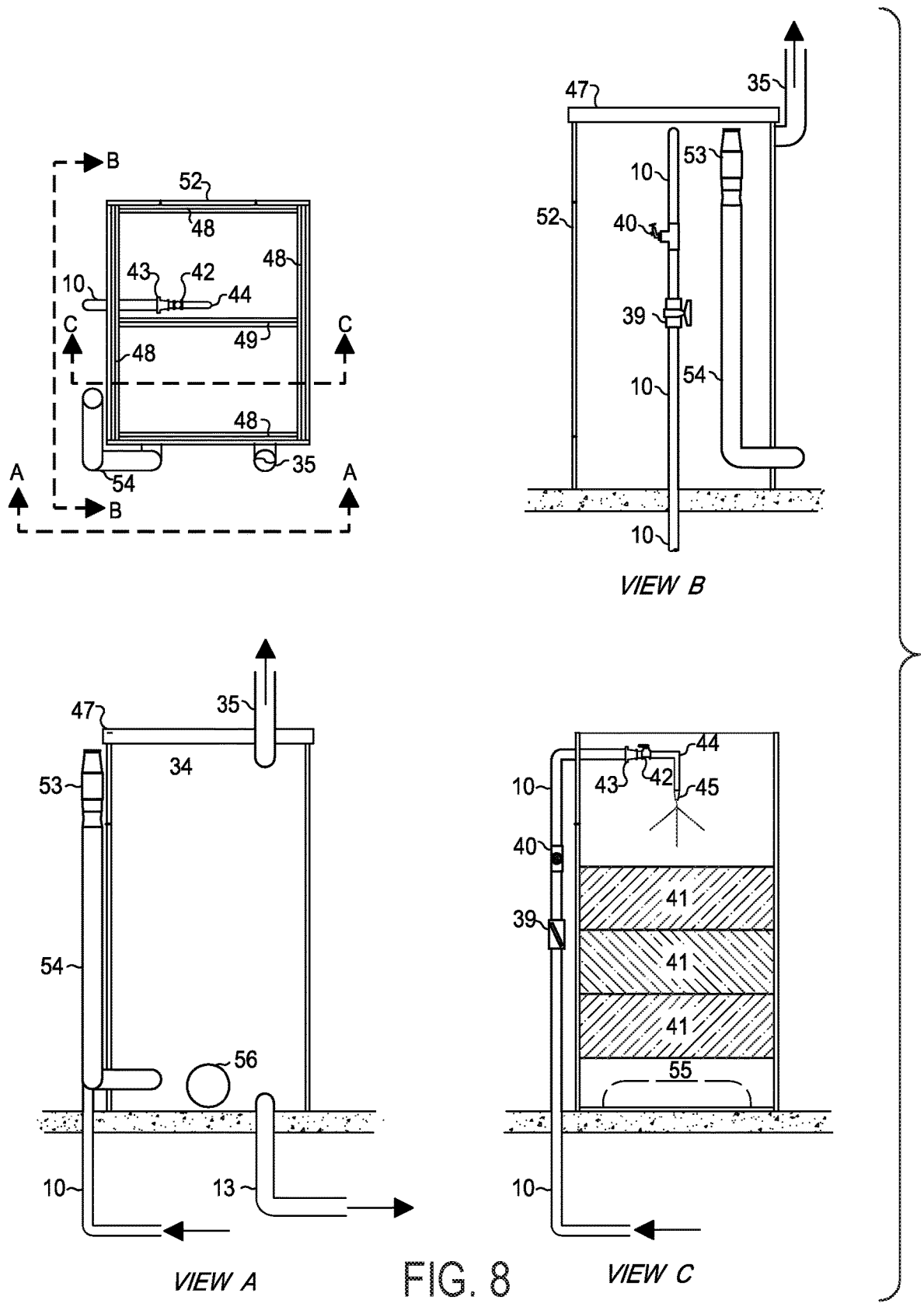
FIG. 8 shows an example of an indoor biofilter cabinet.

The indoor Biofilter cabinet (34) depicted in FIG. 8 bears many similarities to the Outdoor Biofilter (12) shown in FIG. 7. Consistent numbering has been uses where FIG. 8 exemplifies components that are the same as those in FIG. 7. The Indoor BioFilter (34) is mechanically vented. A 4" duct fan (53), connected to 4" duct (54) feeds air into the base of the Biofilter (34). The airflow exits the Biofilter via 4" duct (35) which is extended and terminated above the roof of the building. The filtrate collection chamber (55) drains out a wall of the Biofilter to pipe (13). Inspection access to the filtrate collection chamber (55) is provided by way of an 8" marine hatchway (56).

Example 7—Evaporation Storage Tank

Figure 9:
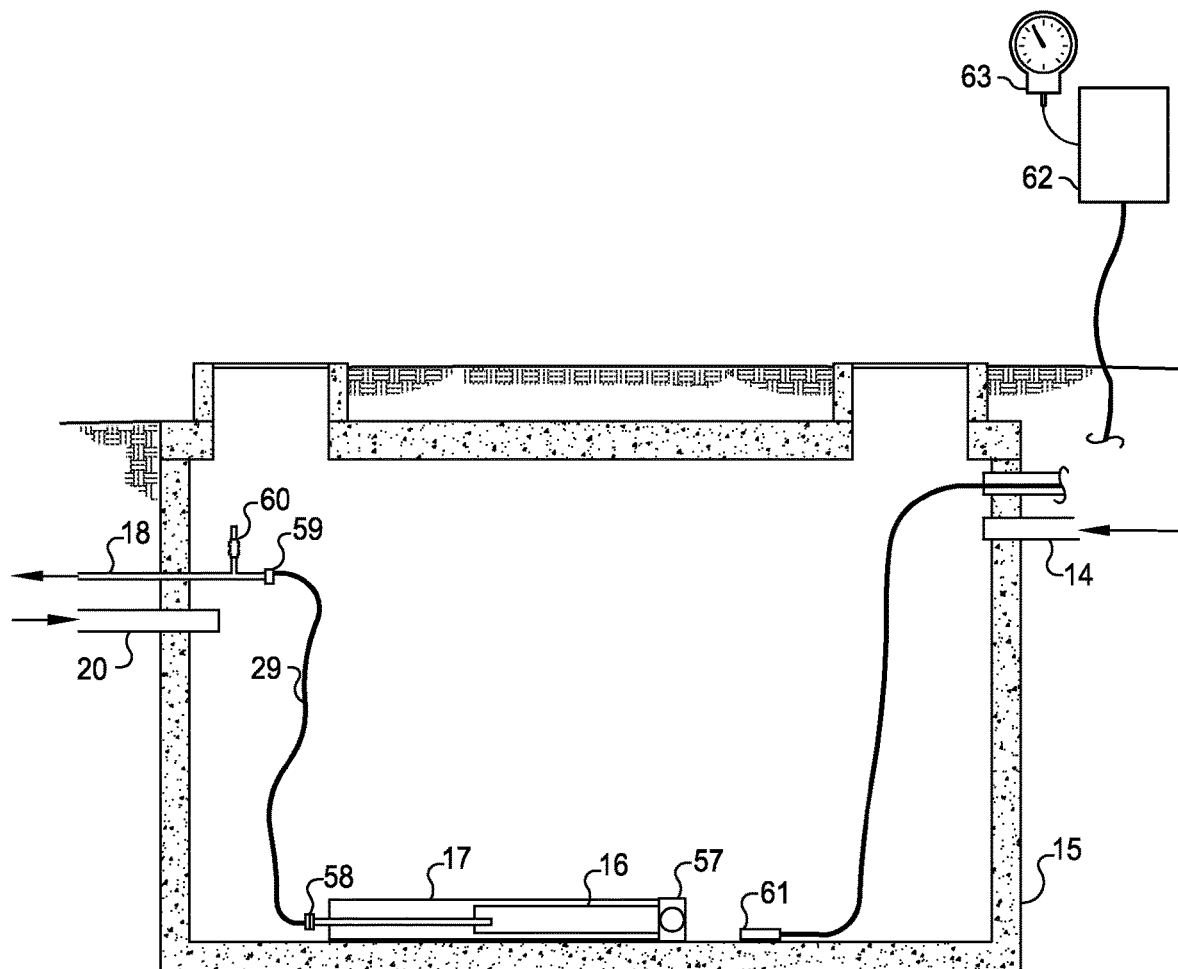
FIG. 9 shows an evaporation storage tank.

FIG. 9 depicts and Evaporation Storage Tank. The Evaporation Storage Tank (15) stores wastewater when the weather characteristics required for evaporation are not met. The size of the tank is determined by the maximum volume of storage required at any time during the year. The estimated storage required for the Eastern Shore of Maryland is 28 days flow or 4,200 gallons. Liquid from Septic Tank #2 enters the below ground tank (15) via pipe (14). A 4" 316 stainless steel submersible well pump (16) installed within 6" pipe casing (17) lays on the floor of the chamber. The pipe casing is fitted with a 6" pipe Tee (57) at the motor end of the pump to serve as a torque arrestor. The discharge end of the pump (16) is connected to a 2" discharge pipe which is terminated just outside the casing with a quick connect fitting (58). The pump end quick connect attaches to its mate which is the terminal end of a 2" pressure rated flexible hose (29). The flexible hose extends and is joined to a quick connect coupling (59) at the terminal end of pipe (18) which feeds the Evaporation structure (19). A vertically oriented ball check valve (60) is attached to pipe (8) to allow the discharge pipe to drain when the pump is not operating. The pump (16) is operated based on the level of the water in the tank which is measured by a pressure transducer (61) connected to a pump controller (62). The controller (62) is programmable and maintains the water level below a set level and above a minimum level. The controller (62) also relies on a combined temperature/humidity sensor (63) to determine if weather conditions are right for evaporation.

What is claimed is:

1. A method of treating wastewater comprising:
   Directing a flow of wastewater to a Density Separation Tank at Rate1;
   Separating the wastewater by density into Portion A and Portion B;
   Circulating the Portion B through at least one Media at Rate2;
   Wherein a ratio of Rate2:Rate1 is greater than 1.
2. The method of claim 1, wherein the ratio of Rate2: Rate1 is greater than 25.
3. The method of claim 1, comprising spraying the Portion B through one or more nozzles, having an angle of greater than 80 degrees.
4. The method of claim 1, wherein the circulating is intermittent.
5. The method of claim 1, wherein a fraction of the Portion B is returned to the Portion A at a rate of between about 1% to 10% of Rate2.
6. The method of claim 1, wherein the at least one Media is maintained at a temperature of greater than 5° C.
7. The method of claim 1, additionally comprising separating a Portion C from the Portion B.
8. The method of claim 7, additionally comprising adding an Antimicrobial to the Portion C.
9. The method of claim 8, additionally comprising filtering the Portion C.
10. The method of claim 7, additionally comprising adding a Reducing Agent to the Portion C.
11. The method of claim 7, comprising evaporating water from the Portion C.
12. The method of claim 11, comprising one or more of misting the Portion C.
13. The method of claim 11, further comprising the evaporating water from the Portion C at an Evaporative Rate of greater than 75% of Rate1.
14. The method of claim 1, comprising adding a compound of chemical formula $Al_nCl_{3n-m}(OH)_m$ to the Portion A or the Portion B.
15. The method of claim 7, wherein the Portion C has a Biological Oxygen Demand less than 5% of that in the wastewater directed into the Portion A.
16. The method of claim 7, wherein the Portion C has a Total Suspended Solids less than 10% of that in the wastewater directed into the Portion A.
17. The method of claim 7, wherein the Portion C has a Total Nitrogen less than 25% of that in the wastewater directed into the Portion A.
18. The method of claim 7, wherein the Portion C has a Total Kjeldahl Nitrogen less than 10% of that in the wastewater directed into the Portion A.
19. The method of claim 7, wherein the Portion C has a Phosphorous Metric less than 2 mg/L.

* * * * *